(12) United States Patent
Sato et al.

(10) Patent No.: US 8,334,073 B2
(45) Date of Patent: Dec. 18, 2012

(54) NON-AQUEOUS ELECTROLYTE SECONDARY BATTERY AND METHOD OF MANUFACTURING NEGATIVE ELECTRODE THEREOF

(75) Inventors: Toshitada Sato, Osaka (JP); Kazuyoshi Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 760 days.

(21) Appl. No.: 12/065,449

(22) PCT Filed: Sep. 25, 2007

(86) PCT No.: PCT/JP2007/068511
§ 371 (c)(1),
(2), (4) Date: Feb. 29, 2008

(87) PCT Pub. No.: WO2008/044461
PCT Pub. Date: Apr. 17, 2008

(65) Prior Publication Data
US 2010/0151329 A1   Jun. 17, 2010

(30) Foreign Application Priority Data
Oct. 12, 2006   (JP) .................. 2006-278723

(51) Int. Cl.
*H01M 4/13* (2010.01)
*H01M 4/58* (2010.01)
(52) U.S. Cl. ............. 429/231.95; 429/218.1; 429/209
(58) Field of Classification Search ............ 429/218.1, 429/231.9, 231.95, 233, 239
See application file for complete search history.

(56) References Cited

U.S. PATENT DOCUMENTS

| | | | |
|---|---|---|---|
| 5,567,474 A | 10/1996 | Dover et al. | |
| 2004/0224231 A1 | 11/2004 | Fujimoto et al. | |
| 2005/0186469 A1* | 8/2005 | De Jonghe et al. | 429/137 |
| 2005/0244715 A1* | 11/2005 | Cho et al. | 429/246 |
| 2006/0035155 A1 | 2/2006 | Tamura et al. | |
| 2007/0059601 A1* | 3/2007 | Natsume et al. | 429/218.1 |
| 2008/0020281 A1* | 1/2008 | Kogetsu et al. | 429/231.5 |
| 2008/0070112 A1* | 3/2008 | Kogetsu et al. | 429/163 |
| 2009/0104528 A1* | 4/2009 | Takahashi et al. | 429/223 |

FOREIGN PATENT DOCUMENTS

| | | |
|---|---|---|
| CN | 1694298 A | 11/2005 |
| CN | 1762065 A | 4/2006 |
| JP | 6-325765 | 11/1994 |
| JP | 2002-83594 | 3/2002 |
| JP | 2002-279974 | 9/2002 |
| JP | 2002-313319 | 10/2002 |
| JP | 2003-017040 | 1/2003 |

(Continued)

OTHER PUBLICATIONS

Korean Office Action issued in Korean Patent Application No. KR 10-2008-7004091 dated Feb. 26, 2010.

(Continued)

*Primary Examiner* — Jennifer Michener
*Assistant Examiner* — Heng Chan
(74) *Attorney, Agent, or Firm* — McDermott Will & Emery LLP

(57) ABSTRACT

A method of manufacturing a negative electrode includes: a first step of forming a plurality of columnar active material blocks capable of electrochemically storing and releasing lithium ions on the surface of a current collector; and a second step of disposing particulate lithium in the gaps between the active material blocks.

4 Claims, 5 Drawing Sheets

FOREIGN PATENT DOCUMENTS

| | | | |
|---|---|---|---|
| JP | 200317040 A | * | 1/2003 |
| JP | 2004-146296 | | 5/2004 |
| JP | 2005063805 A | * | 3/2005 |
| JP | 2005-196970 | | 7/2005 |
| JP | 2005196970 A | * | 7/2005 |
| JP | 2005-317551 | | 11/2005 |
| WO | WO 2004097962 A1 | * | 11/2004 |
| WO | WO 2007052803 A1 | * | 5/2007 |

OTHER PUBLICATIONS

Chinese Office Action issued in Chinese Patent Application No. CN 2007800009038 dated Sep. 11, 2009.

* cited by examiner

NON-AQUEOUS ELECTROLYTE SECONDARY BATTERY AND METHOD OF MANUFACTURING NEGATIVE ELECTRODE THEREOF

TECHNICAL FIELD

The present invention relates to a non-aqueous electrolyte secondary battery, and more particularly to improvement of the capacity of a non-aqueous electrolyte secondary battery that uses an active material having a large capacity density, such as silicon (Si) and Si compounds, for the negative electrode thereof.

BACKGROUND ART

A non-aqueous electrolyte secondary battery represented by a lithium-ion secondary battery is drawing attention as a power supply with large capacity mainly for portable equipment. Recently, to further increase the capacity of such a battery, development of electrode materials (use of active materials having large capacity density and reduction of additional materials) and improvement of structural parts (for example, reduction of thickness) have been made actively.

Among the electrode materials, Si and Si compounds to be used as a negative electrode active material are the materials having large capacity of which theoretical capacity is much higher than that of graphite. For this reason, modifying research on Si and Si compounds is attempted for utilization thereof. Reported examples of this research include a non-aqueous electrolyte secondary battery that uses a thin film of Si formed on a current collector of a copper foil or the like (see Patent Document 1, for example), and a non-aqueous electrolyte secondary battery that uses a Si oxide having a lower capacity but longer life than Si as the negative electrode active material (see Patent Document 2, for example).

Generally, Si and Si compounds used as a negative electrode active material produce an extremely large irreversible capacity. The irreversible capacity results from the amount of lithium that is stored at charging but is not released at discharging. Thus, to uniformly compensate for the irreversible capacity, the following method is proposed. An electrode body is formed so that the surface of the negative electrode thereof has a dispersion coating of lithium powder. Then, when an electrolyte solution is poured, a local cell is formed to cause the negative electrode to store lithium. To disperse lithium powder on the surface of the negative electrode in this manner, the following method is proposed (see Patent Document 3, for example). A liquid dispersion containing lithium powder dispersed in a volatile dispersing medium is applied to the negative electrode and dried.

However, to make the negative electrode securely hold the amount of lithium powder necessary to compensate for the irreversible capacity of the negative electrode active material, a binder should further be added to the liquid dispersion. When a binder is not used, it is highly possible that lithium powder fall off from the negative electrode in the step of forming the electrode body. On the other hand, when a binder is used, the binder remains on the surface of the negative electrode and increases internal resistance.

Patent Document 1: Japanese Patent Unexamined Publication No. 2002-83594
Patent Document 2: Japanese Patent Unexamined Publication No. H06-325765
Patent Document 3: Japanese Patent Unexamined Publication No. 2005-317551

SUMMARY OF THE INVENTION

The present invention provides a method of making uniform compensation for irreversible capacity, i.e. the problem of a negative electrode active material having a large capacity density, without using a binder, to provide a non-aqueous electrolyte secondary battery having a large capacity and excellent balance of characteristics. A method of manufacturing a negative electrode according to the present invention includes:

a first step of forming a plurality of columnar active material blocks capable of electrochemically storing and releasing lithium ions, on the surface of a current collector; and a second step of disposing particulate lithium in gaps between the active material blocks.

With this method, particulate metal lithium can uniformly compensate for the large irreversible capacity of a negative electrode material having a large capacity density. Thus, this method can provide a non-aqueous electrolyte secondary battery having a large capacity and excellent balance of characteristics. In particular, it is preferable that columnar active material blocks capable of electrochemically storing and releasing lithium are formed on the surface of the current collector. With this structure, even when the active material blocks are expanded and shrunken by charging and discharging, respectively, the stress generated thereby can be distributed in the direction parallel to and in the direction perpendicular to the principle surface of the negative electrode to inhibit the active material from peeling. Further, lithium disposed in the gaps between the active material blocks can uniformly compensate for the irreversible capacity. Holding lithium between the active material blocks prevents lithium from falling off during the winding operation or the like in fabrication of an electrode body. Further, because no binder is used, the battery characteristics are not deteriorated.

DETAILED DESCRIPTION OF PREFERRED EMBODIMENT

Hereinafter, a description is provided of an exemplary embodiment of the present invention, with reference to the accompanying drawings. The present invention is not limited to the following description, as long as the invention is based on the basic features described in this specification.

Figure 1:
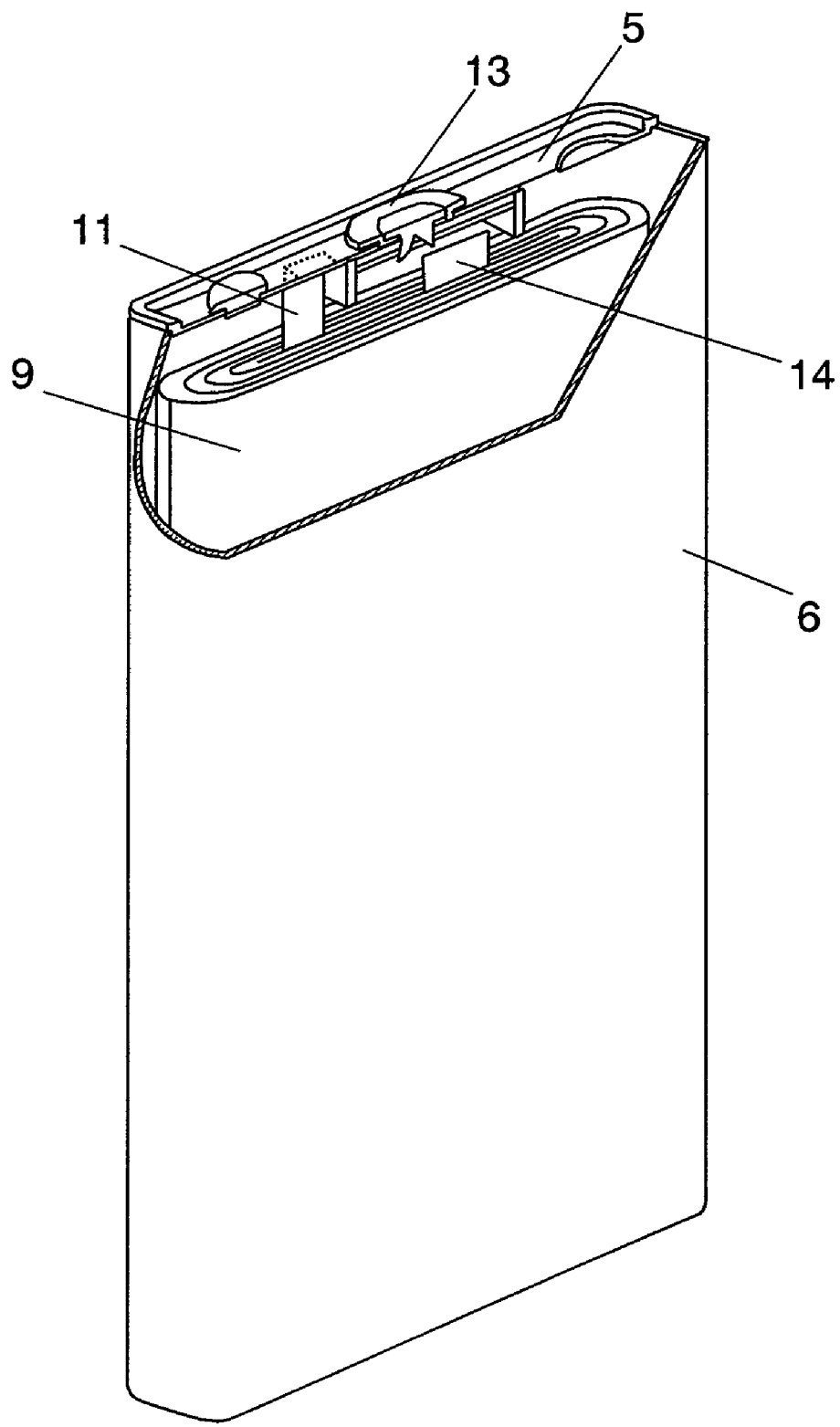
FIG. 1 is a partially cutaway view in perspective of a non-aqueous electrolyte secondary battery in accordance with an exemplary embodiment of the present invention.
Figure 2:
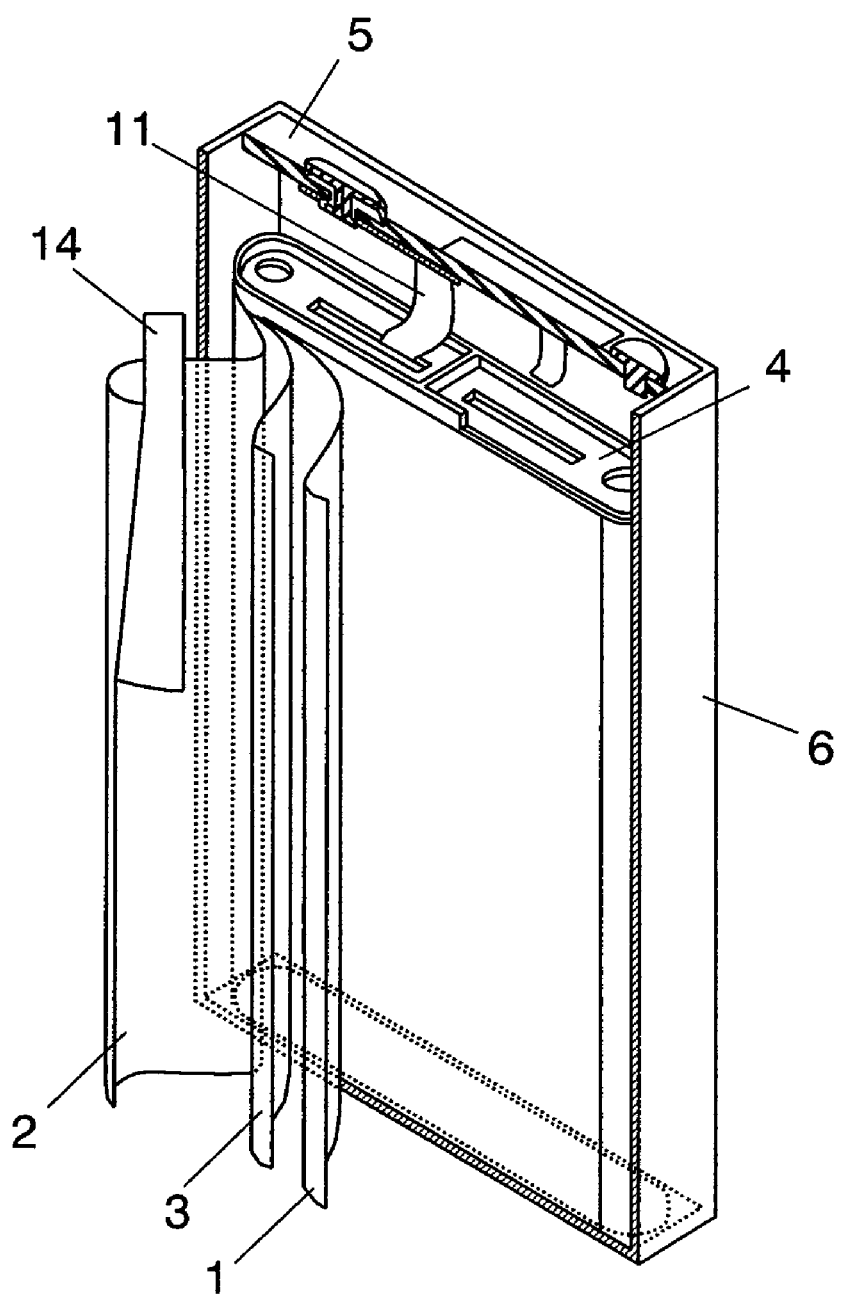
FIG. 2 is an exploded perspective view of the non-aqueous electrolyte secondary battery shown in FIG. 1.
Figure 3A:
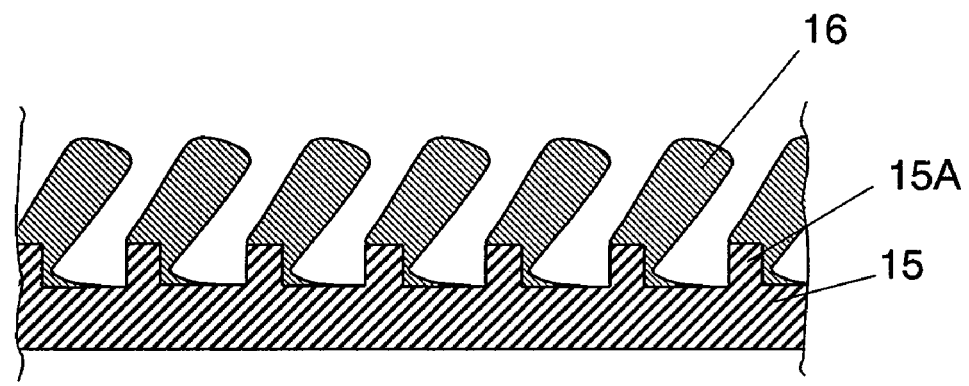
FIG. 3A is a schematic sectional view of a current collector for a negative electrode of the non-aqueous electrolyte secondary battery of FIG. 1, in a state of having active material blocks thereon.
Figure 4:
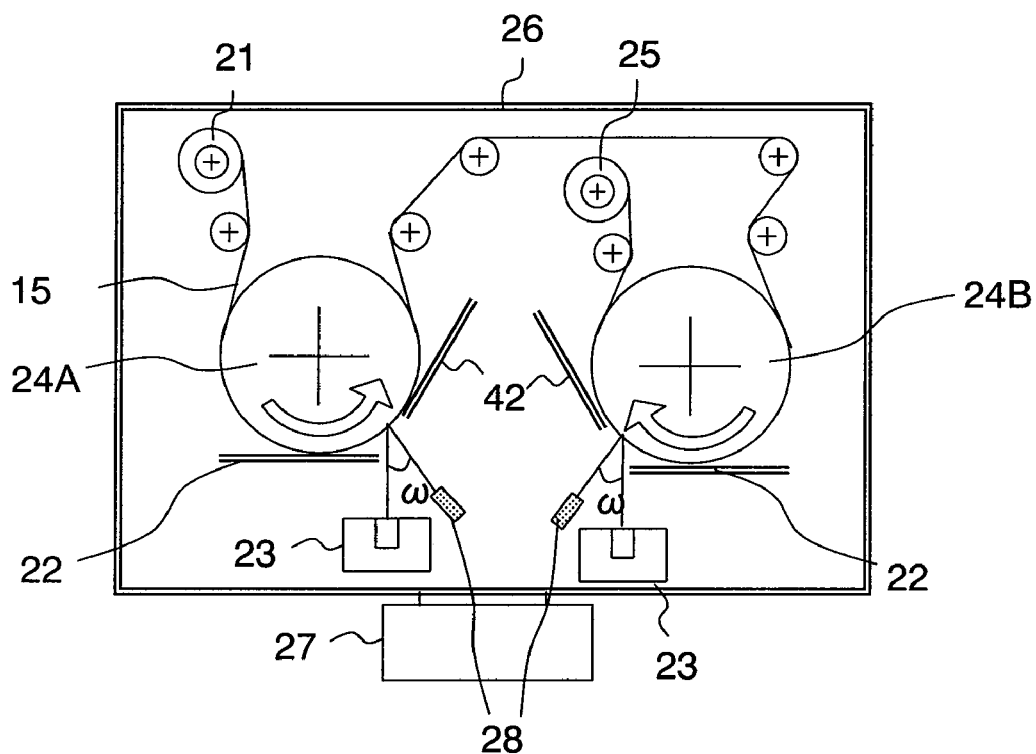
FIG. 4 is a schematic view showing a structure of an apparatus for fabricating a precursor of the negative electrode in the states of FIG. 3A.

FIG. 1 is a partially cutaway view in perspective of a non-aqueous electrolyte secondary battery in accordance with an exemplary embodiment of the present invention. FIG. 2 is an exploded perspective view of the non-aqueous electrolyte secondary battery. FIG. 3A is a schematic sectional view of an example of a negative electrode of the non-aqueous electrolyte secondary battery. FIG. 4 schematically shows a structure of an apparatus for fabricating the negative electrode.

With reference to FIGS. 1 and 2, this prismatic battery includes negative electrode 1, positive electrode 2 facing negative electrode 1 and reducing lithium ions at discharging, and separator 3 disposed between negative electrode 1 and positive electrode 2 and preventing direct contact between negative electrode 1 and positive electrode 2. Negative electrode 1 and positive electrode 2 are wound together with separator 3 to form electrode body 9. Electrode body 9 is housed in case 6 together with a non-aqueous electrolytic solution (not shown). Resin frame 4 is disposed on electrode body 9. Resin frame 4 isolates electrode body 9 from sealing plate 5 and also isolates lead 11 from case 6.

As shown in FIG. 3A, negative electrode 1 includes current collector 15 and a plurality of columnar active material blocks 16 provided on the surface of current collector 15. Current collector 15 includes a large number of projections 15A on the surface thereof. Lead 11 is attached to current collector 15 by welding or the like. Another end of lead 11 is connected to terminal 13 provided on sealing plate 5. Active material blocks 16 are formed on both sides of current collector 15.

Positive electrode 2 includes a positive electrode current collector, and positive electrode active material layers containing a positive electrode active material (both not shown). Lead 14 is attached to the positive electrode current collector. Another end of lead 14 is connected to case 6 that also works as a positive electrode terminal. The positive electrode active material layers are formed on both sides of the positive electrode current collector, respectively.

Next, a description is provided of the structure of negative electrode 1. Active material blocks 16 are made of a material capable of storing and releasing lithium ions. Materials usable as the active material are those capable of storing and releasing a large amount of lithium ions at a lower electric potential than the positive electrode active material. Such usable materials include silicon (Si) and tin (Sn). Such a material can offer the advantage of the present invention, even when the material is any one of an element, alloy, compound, solid solution, and complex active material containing silicon material or tin material. In particular, silicon-containing material has a large capacity density and a low cost, and thus is preferable. As examples of the silicon-containing material, Si and $SiO_x$ ($0<x<2$), and an alloy, compound, and solid solution of one of the above substances in which a part of Si is substituted with at least one element selected from a group consisting of B, Mg, Ni, Ti, Mo, Co, Ca, Cr, Cu, Fe, Mn, Nb, Ta, V, W, Zn, C, N, and Sn can be used. Other than these, tin-containing material, such as $Ni_2Sn_4$, $Mg_2Sn$, $SnO_x$ ($0<x<2$), $SnO_2$, $SnSiO_3$, and LiSnO, can be used.

In this exemplary embodiment, preferably, active material blocks 16 securely adhere to the surface of current collector 15 of negative electrode 1. In particular, preferably, negative electrode 1 is fabricated by a vacuum film forming method represented by vacuum vapor deposition, sputtering, chemical vapor deposition (CVD), or the like.

The negative electrode active material may be made of only one of the above materials or made up of a plurality of kinds of the materials in combination. As examples of forming the negative electrode active material using the plurality of kinds of the materials include: a compound containing Si, oxygen, and nitrogen; and a complex of a plurality of compounds that contain Si and oxygen and have different constituent ratios of Si and oxygen. Among these materials, $SiO_x$ ($0.1 \leq x \leq 1.8$) is preferable, because this substance has a large discharge capacity density, and has an expansion coefficient at charging smaller than that of the element Si. These properties can provide a non-aqueous electrolyte secondary battery having a high electrochemical reaction efficiency, a large capacity, and a relatively low cost. Among these materials, $SiO_x$ ($0.3 \leq x \leq 1.0$) is particularly preferable because this substance has an excellent balance between the capacity and the expansion coefficient.

Materials usable for current collector 15, lead 11, and terminal 13 include a metal foil made of stainless steel, nickel, copper, titanium, or the like, and a thin film made of carbon or conductive resin. Further, surface treatment may be provided thereon using carbon, nickel, titanium, or the like.

Next, a description is provided of the structure of positive electrode 2. The positive electrode active material layer contains a lithium-containing multiple oxide, such as $LiCoO_2$, $LiNiO_2$, $LiMn_2O_4$, and a mixture or complex compound of these substances, as the positive electrode active material. In particular, $Li_xM_yN_{1-y}O_2$ (where M and N are at least one kind selected from a group consisting of Co, Ni, Mn, Cr, Fe, Mg, Al, and Zn and include at least Ni, M≠N, $0.98 \leq x \leq 1.10$, and $0<y \leq 1$) is preferable because of a large capacity density thereof.

Other examples usable for the positive electrode active material include: olivine-type lithium phosphates expressed by a general formula of $LiMPO_4$ (M=V, Fe, Ni, and Mn); and lithium fluorophosphates expressed by a general formula of $Li_2MPO_4F$ (M=V, Fe, Ni, and Mn). Further, a part of each of these lithium-containing compounds may be substituted with different elements. Surface treatment may be provided using a metal oxide, lithium oxide, or conductive agent. Alternatively, hydrophobic treatment may be provided on the surface thereof.

The positive electrode active material layer further includes a conductive agent and a binder. The materials of the conductive agent include: graphite such as natural graphite and artificial graphite; carbon black such as acetylene black, Ketjen black, channel black, furnace black, lamp black, and thermal black; conductive fiber such as carbon fiber and metal fiber; metal powder made of aluminum or the like; conductive whiskers such as zinc oxide whisker and potassium titanate whisker; conductive metal oxide such as a titanium oxide; and organic conductive material such as a phenylene derivative.

The materials usable for the binder include: polyvinylidene fluoride, polytetrafluoroethylene, polyethylene, polypropylene, an aramid resin, polyamide, polyimide, polyamide-imide, polyacrylonitrile, polyacrylic acid, polymethylacrylate, polyethylacrylate, polyhexylacrylate, poly methacrylic acid, polymethyl methacrylate, polyethyl methacrylate, polyhexyl methacrylate, polyvinyl acetate, polyvinyl pyrrolidone, polyether, polyethersulfone, hexafluoropolypropylene, styrene-butadiene rubber, and carboxymethylcellulose. Other materials usable for the binder include copolymers containing at least two kinds selected from tetrafluoroethylene, hexafluoroethylene, hexafluoropropylene, perfluoro alkyl vinyl ether, vinylidene fluoride, chlorotrifluoroethylene, ethylene, propylene, pentafluoropropylene, fluoromethyl vinyl ether, acrylic acid, and hexadiene. At least two kinds selected from these materials may be mixed.

Materials usable for the positive electrode current collector, lead 14, and case 6 include aluminum (Al), carbon, and conductive resin. Further, surface treatment may be provided on any one of these materials using carbon or the like.

The materials usable for the non-aqueous electrolyte include: non-aqueous electrolyte solution containing solute dissolved in organic solvent; and a so-called polymer electrolyte layer containing such non-aqueous electrolyte solution defluidized. At least when an electrolyte solution is used, it is preferable to use separator 3 of a nonwoven fabric or micro-porous membrane made of such a material as polyethylene, polypropylene, an aramid resin, amide-imide, polyphenylene sulfide, and polyimide, between positive electrode 2 and negative electrode 1, and impregnate separator 3 with the electrolyte solution.

The materials of the non-aqueous electrolyte are selected according to the oxidation-reduction potential of the active materials. The preferable materials for the solute of the non-aqueous electrolyte are salts generally used for lithium batteries. Such salts include: $LiPF_6$; $LiBF_4$; $LiClO_4$; $LiAlCl_4$; $LiSbF_6$; LiSCN; $LiCF_3SO_3$; $LiN(CF_3CO_2)_2$; $LiN(CF_3SO_2)_2$; $LiAsF_6$; $LiB_{10}Cl_{10}$; lower aliphatic lithium carboxylate; LiF; LiCl; LiBr; LiI; chloroborane lithium; various borates, such as lithium bis(1,2-benzenediolate (2-)-O,O') borate, lithium bis(2,3-naphthalenediolate (2-)-O,O') borate, lithium bis (2,2'-biphenyldiolate (2-)-O,O') borate, and lithium bis (5-fluoro-2-olate-1-benzenesulfonic acid-O,O') borate; and tetraphenyl lithium borate.

For the organic solvent in which the above salts are dissolved, solvents generally used for lithium batteries can be used. The examples of the organic solvent include the following that may be used either by itself or in combination: ethylene carbonate (EC); propylene carbonate; butylene carbonate; vinylene carbonate; dimethyl carbonate (DMC); diethyl carbonate; ethyl methyl carbonate (EMC); dipropyl carbonate; methyl formate; methyl acetate; methyl propionate; ethyl propionate; dimethoxymethane; γ-butyrolactone; γ-valerolactone; 1,2-diethoxyethane; 1,2-dimethoxyethane; ethoxymethoxyethane; trimethoxymethane; tetrahydrofuran derivatives, such as tetrahydrofuran and 2-methyl-tetrahydrofuran; dimethyl sulfoxide; dioxolane derivatives, such as 1,3-dioxolane and 4-methyl-1,3-dioxolane; formamide; acetamide; dimethylformamide; acetonitrile; propylnitrile; nitromethane; ethylmonoglyme; triester phosphate; acetate ester; propionate ester; sulfolane; 3-methyl-sulfolane; 1,3-dimethyl-2-imidazolidinone; 3-methyl-2-oxazolidinone; propylene carbonate derivatives; ethyl ether; diethyl ether; 1,3-propanesultone; anisole; and fluorobenzene.

The organic solvent may further contain an additive, such as vinylene carbonate, cyclohexylbenzene, biphenyl, diphenyl ether, vinylethylene carbonate, divinylethylene carbonate, phenylethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, and m-terphenyl.

The non-aqueous electrolyte may be used as a solid electrolyte by mixing one of the above solutes into at least one of the following polymeric materials: polyethylene oxide, polypropylene oxide, polyphosphazene, polyaziridine, polyethylene sulfide, polyvinyl alcohol, polyvinylidene fluoride, and polyhexafluoropropylene. Alternatively, the non-aqueous electrolyte may be used in a gel form by mixing the solid electrolyte in one of the above organic solvents.

Next, a brief description is provided of the method of manufacturing positive electrode 2. A particulate positive electrode active material classified according to a predetermined grain size is stirred together with a binder, conductive agent, and appropriate amount of dispersing medium to provide a positive electrode mixture paste. This paste is applied to both sides of the positive electrode current collector, dried, and roll-pressed. Thus, the positive electrode active material layers are formed on both sides of the positive electrode current collector, respectively. Thereafter, the positive electrode thus formed is slit to have a width such that the electrode can be inserted into prismatic case 6. A part of the positive electrode active material layers are peeled and lead 14 is connected to the positive electrode current collector. Thus, positive electrode 2 is fabricated.

Next, a description is provided of the method of manufacturing negative electrode 1 with reference to FIG. 4. In the manufacturing apparatus of FIG. 4, current collector 15 is fed from feed roll 21 to wind-up roll 25 via film-deposition rolls 24A and 24B. These rolls and evaporation units 23 are provided in vacuum chamber 26. The inside of vacuum chamber 26 is depressurized by vacuum pump 27. In each evaporation unit 23, an evaporation source, crucible, and electron beam generation device are unitized.

Current collector 15 has a large number of projections 15A on the surfaces thereof. For example, a 30-μm-thick electrolytic copper foil on which asperities of Ra=2.0 μm are formed by electrolytic plating is used as current collector 15. The inside of vacuum chamber 26 is set to have a low-pressure atmosphere of an inert gas, e.g. an argon atmosphere at a pressure of 3.5 Pa. During vapor deposition, an electron beam generated by the electron beam generation device is polarized by a polarizing yoke so that the evaporation source is irradiated with the polarized beam. For example, Si is used for this evaporation source. The shape of the opening of mask 22 is adjusted to prevent the vapor of the material of the evaporation source generated in evaporation unit 23 from entering perpendicularly to the surface of current collector 15.

In this manner, while the vapor of the evaporation source material is supplied to the surfaces of current collector 15, current collector 15 is fed from feed roll 21 to wind-up roll 25. Thus, the vapor of the evaporation source material deposits over projections 15A as anchor points, to form active material blocks 16. In other words, when Si is used as the evaporation source material, active material blocks 16 of Si are produced.

When oxygen nozzle 28 is provided to form angle ω with respect to the incident direction of the vapor of the evaporation source material and oxygen is introduced from oxygen nozzle 28 into vacuum chamber 26, active material blocks 16 made of an oxide of the evaporation source material are produced. For example, angle ω is set at 65°, oxygen gas having a purity of 99.7% is introduced from oxygen nozzles 28 into vacuum chamber 26, and the film forming speed is set at approximately 20 nm/sec. In this case, 21-μm-thick columnar active material blocks 16 made of $SiO_{0.4}$ are produced on projections 15A of current collector 15. After active material blocks 16 are formed on one side using film-deposition roll 24A, current collector 15 is fed to film-deposition roll 24B, where active material blocks 16 can also be formed on the other side in a similar manner. Thus, a precursor of negative electrode 1 is fabricated first.

Figure 3B:
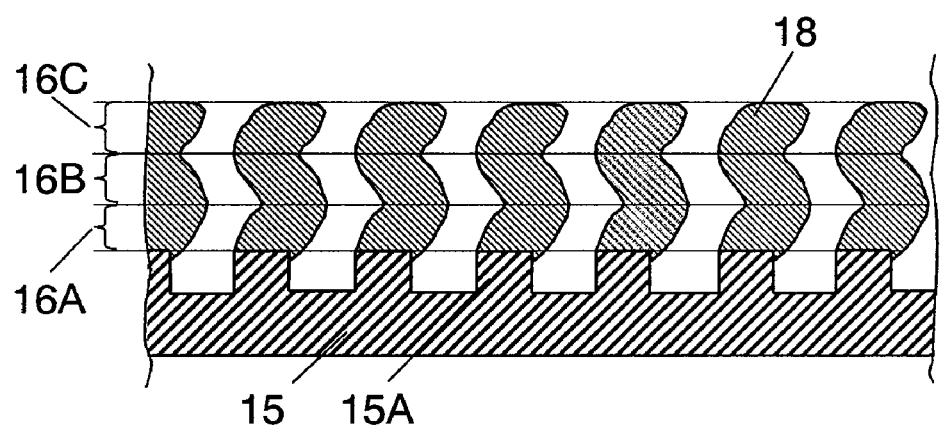
FIG. 3B is a schematic sectional view of a current collector for a negative electrode of the non-aqueous electrolyte secondary battery of FIG. 1, in a state of having another shape of active material blocks thereon.

In addition to the above method, a precursor of negative electrode 1 as shown in the schematic sectional view of FIG. 3B may be fabricated in the following manner. After thin active material blocks 16A (having a thickness of 1 μm or smaller, for example) are formed in the above manufacturing apparatus, active material blocks 16B having an equivalent thickness are formed from the opposite direction. Repeating these steps to further form active material blocks 16C can provide columnar active material blocks 18 having a wave shape in the direction perpendicular to the surface of current collector 15 on which active material blocks 16A are formed. FIG. 3B shows three-tiered active material blocks. However, the number of tiers is not limited.

Heat-resistant adhesive tapes are put to both sides of current collector 15 equidistantly in advance. Peeling off the tapes after film deposition can provide exposed portions of the current collector to be welded to lead 11.

In addition to the above methods, a precursor of negative electrode 1 having current collector 15 and a plurality of columnar active material blocks 16 provided on the surface thereof may be fabricated by the method disclosed in Japanese Patent Unexamined Publication No. 2003-17040 or Japanese Patent Unexamined Publication No. 2002-279974. However, it is preferable that active material blocks 16 are formed to be inclined with respect to the surface of current collector 15. Alternatively, it is preferable to form columnar active material blocks having a wave shape in the direction perpendicular to current collector 15. With these structures, particulate lithium 17 can be held more securely.

Forming active material blocks 16 or 18 in either of these shapes improves the charge/discharge cycle characteristics of the negative electrode. One of the reasons for this improvement is considered as follows. A chemical element having a property of storing lithium ions expands and shrinks at storing and releasing lithium ions, respectively. The stress generated with this expansion and shrinkage is distributed in the direction parallel to and in the direction perpendicular to the surface of current collector 15 on which active material blocks 16 or 18 are formed. This distribution inhibits generation of crinkles in current collector 15 and peeling of active material blocks 16 or 18. Thus, the charge/discharge cycle characteristics are improved.

Lithium 17 is disposed in the gaps between active material blocks 16 or 18 of the precursor of negative electrode 1 fabricated as described above. A description is provided of an example of this method, using a case where active material blocks 16 are formed as a representative. First, particulate lithium 17 is fabricated by a method arranged according to the method disclosed in U.S. Pat. No. 5,567,474. U.S. Pat. No. 5,567,474 shows a method of manufacturing lithium having a relatively large grain size. However, to disposed lithium 17 in the gaps between active material blocks 16, the grain size of lithium 17 is set at 15 μm or smaller, for example.

More specifically, 300 grams of metal lithium ingot and 2 grams of metal sodium are thrown into liquid paraffin and stirred while the mixture is heated to 200° C. in a glove box filled with argon gas. After both metals are molten, carbon dioxide gas is supplied to the molten one. At this time, carbon dioxide gas is flown at 5 L/min., and for 10 min. After completion of the supply, stirring and heating are stopped. After the molten one are cooled to room temperature, metal particles deposit on the bottom of the reactor. The liquid paraffin is removed from the particles using a glass filter, and the particles are repeatedly washed with hexane.

The chemical composition analysis of the particles prepared in this procedure shows that lithium accounts for 99% or more. The results obtained using a scanning electron microscope (SEM) and electronic prove micro analyzer (EPMA) show that the surface is covered with lithium carbonate. The grain size distribution of these particles is in a wide range from 0.8 μm to 50 μm inclusive. The grain size corresponding to a percentage passing of 50% in the grain size accumulation curve, i.e. D50, is 12 μm. These particles are classified and only particles having a grain size of 15 μm or smaller are used.

Alternatively, lithium ingot is placed in a high-frequency melting crucible (made of copper, water-cooled) and heated in a vacuum in a vacuum vapor deposition device (not shown). Directly above the crucible, a water-cooling stage is placed to face the crucible. Nickel meshes are bonded to the surfaces of the water-cooling stage. When the nickel meshes are taken out after completion of the vapor deposition, particulate lithium has deposited on the surfaces and inside thereof. These nickel meshes are immersed in a dispersing medium to be described later, and ultrasonic dispersion, for example, is performed. Then, particulate lithium 17 can easily be separated from the nickel meshes. When the inside of the vacuum chamber of the vacuum vapor deposition device is returned to atmospheric pressure, carbon dioxide gas is introduced. Then, the surface of particulate lithium 17 is covered with lithium carbonate. With this method, particulate lithium 17 having a grain size distribution from 0.3 μm to 13 μm inclusive can be prepared. In this case, the particles can be used without classification.

As described above, it is preferable that particulate lithium 17 is produced by vacuum vapor deposition or stirring molten lithium. Producing particulate lithium 17 by the vacuum vapor deposition or stirring molten lithium allows preparation of lithium 17 having grain sizes such that the lithium can uniformly be disposed in the gaps between active material blocks 16. As a result, compensation for irreversible capacity is allowed.

Particulate lithium 17 prepared in one of those manners is dispersed in a dispersing medium. Any dispersing medium can be used without specific limitation as long as the solvent is easily removed because of a low boiling point, and has low reactivity with lithium and a property of leaving no residue after drying. The typical examples of the dispersing medium include toluene, acetonitrile, acetone, tetrahydrofuran, and dimethylformamide. The combination ratio of particulate lithium to the dispersing medium is in the range of 5 wt % to 20 wt %, for example, in consideration of the fluidity during application and the amount of lithium per application.

Figure 5:
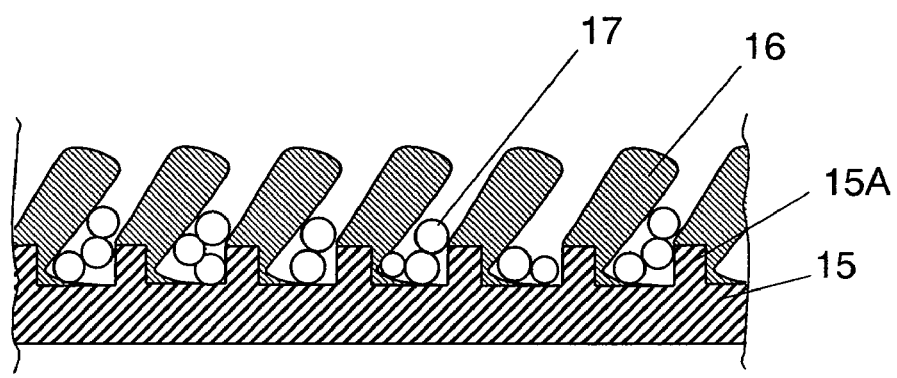
FIG. 5 is a sectional view showing that lithium is disposed in the gaps between the active material blocks in the states of FIG. 3.

This liquid dispersion is applied to the surface of the precursor of negative electrode 1, and dried. Thus, as shown in the sectional view of FIG. 5, most of lithium 17 is fitted in the gaps between active material blocks 16. For this coating, general liquid coating methods can be used. The typical examples of the method include knife coating, direct roll coating, reverse roll coating, gravure roll coating, gap coating, spray coating, slot die coating, and tape casting.

The amount of lithium necessary for the negative electrode active material depends on the irreversible capacity of the negative electrode active material. For example, $SiO_{0.3}$ has an irreversible capacity of approximately 30%. Thus, assuming that the theoretical capacity density of lithium is 3,861 mAh/g, lithium 17 in a weight corresponding to the irreversible capacity or more is applied to negative electrode 1. For a battery having a design capacity of 3,000 mAh, for example, an amount corresponding to 4,286 mAh of the negative electrode active material should be filled in a battery. Thus, lithium 17 in a weight of at least 0.333 grams corresponding to an irreversible capacity of 1,286 mAh is applied to negative electrode 1.

In this manner, for this exemplary embodiment, particulate lithium 17 is disposed in the gaps between active material blocks 16 or 18. With this method, particulate lithium 17 can uniformly compensate for the large irreversible capacity of the negative electrode active material having a large capacity density. Thus, a non-aqueous electrolyte secondary battery having a large capacity and excellent balance of characteristics can be provided. In particular, it is preferable that a plurality of columnar active material blocks 16 or 18 capable of electrochemically storing and releasing lithium are formed on the surfaces of current collector 15. With this structure, even when active material blocks 16 or 18 are expanded and shrunken by charging and discharging, respectively, the stress generated thereby can be distributed in the direction parallel to and in the direction perpendicular to the principle surface of negative electrode 1 to inhibit the active material from peeling. Further, lithium 17 disposed in the gaps between the active material blocks 16 or 18 can uniformly compensate for the irreversible capacity. Holding lithium 17 between active material blocks 16 or 18 prevents lithium 17 from falling off during the winding operation or the like in fabrication of electrode body 9. Further, because no binder is used, the battery characteristics are not deteriorated. Further, disposed lithium 17 does not cover the surface of negative electrode 1 completely, and the gaps between active material blocks 16 are easily impregnated with non-aqueous electrolyte solution when the non-aqueous electrolytic solution is poured. Increasing the surface area by pulverizing lithium offers a distinct advantage as a source of compensating for irreversible capacity.

In particular, it is preferable that a liquid dispersion containing particulate lithium 17 dispersed in a dispersing medium is applied to current collector 15 having active material blocks 16 formed thereon, and dried. In other words, it is preferable that the liquid dispersion is applied by liquid coating instead of vapor deposition. The use of a liquid dispersion in this manner allows lithium 17 to uniformly be dispersed on negative electrode 1 using a general liquid coating method.

A non-aqueous electrolyte secondary battery is formed using negative electrode 1 thus fabricated. When a non-aqueous electrolyte is brought into contact with active material blocks 16 and lithium 17, a local cell mechanism causes active material blocks 16 to store lithium ions. The storing allows compensation for the irreversible capacity of the negative electrode active material. Thus, a non-aqueous secondary battery having a large capacity and excellent balance of characteristics can be produced.

The temperature in the drying step is set not to exceed the melting temperature of lithium, i.e. 180° C. The drying step may be performed in a vacuum atmosphere to remove the dispersing medium completely.

It is preferable that a lithium carbonate layer is formed on the surface of lithium 17 before lithium 17 is disposed in the gaps between active material blocks 16. This method is also disclosed in U.S. Pat. No. 5,567,474. Alternatively, for vacuum vapor deposition, a lithium carbonate layer can be formed by returning the inside of the chamber to atmospheric pressure using carbon dioxide gas as described before. The lithium carbonate layer formed on the surface of lithium 17 inhibits the reaction with nitrogen or oxygen in the air and allows effective use of lithium 17 inside. In addition, formation of a compound having a stable surface also allows safety use.

Figure 6:
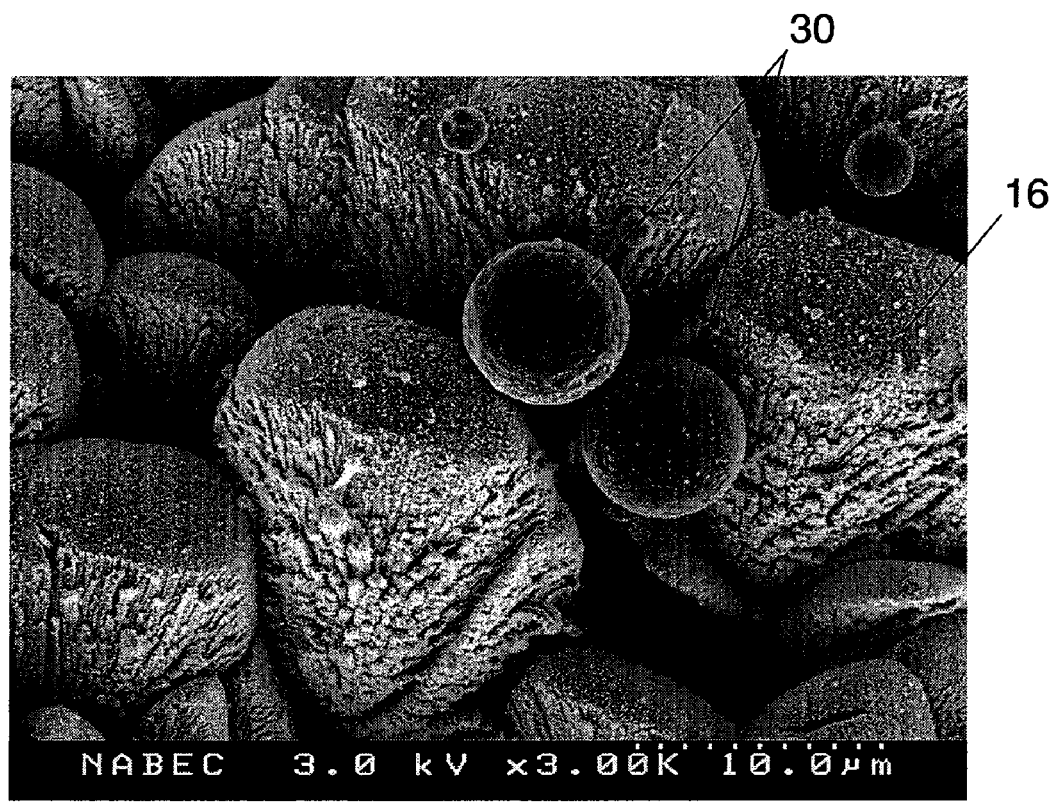
FIG. 6 is an electron micrograph view that shows the surface of the negative electrode of FIG. 5 observed when a non-aqueous electrolyte secondary battery is produced using the negative electrode and disassembled.

A battery was produced by using negative electrode 1 in which particulate lithium 17 having a lithium carbonate layer on the surface thereof compensated for the irreversible capacity as described above. By using the battery, the following verification was performed. The battery after discharging was disassembled and the surface of negative electrode 1 was observed using a scanning electron microscope. As a result, existence of spherical bodies 30 as shown in FIG. 6 was observed. Spherical bodies 30 were separated and collected from negative electrode 1 using dimethyl carbonate, and analyzed by Li—NMR. No peak was detected in the chemical shift (230 ppm) showing the existence of metal lithium. The peaks were detected only in the chemical shifts from 0 to 30 ppm showing lithium compounds. Further, the results of infrared spectral analysis showed that spherical bodies 30 were made of lithium carbonate. In this manner, lithium carbonate was detected on the surface of negative electrode 1 with a trace of particles. This is because the lithium carbonate layer on the surface of particulate lithium 17 does not react with active material blocks 16. Thus, formation of the lithium carbonate layer on the surface of lithium 17 can be verified.

In the descriptions of this exemplary embodiment, a prismatic battery is used as an example. However, the present invention can be used for non-aqueous electrolyte secondary batteries of various shapes, e.g. cylindrical, flat, coin-shaped, and prismatic batteries, without specific limitation to the battery shape. The present invention can also be used for a battery that includes an electrode plate group having a wound or laminated structure. The present invention can be used for batteries having various sealing forms, including a battery in which electricity generating elements, such as electrodes and electrolyte solution, are housed in a metallic battery can or a laminated-film case. The sealing forms of batteries are not specifically limited.

INDUSTRIAL APPLICABILITY

A method of manufacturing a negative electrode of the present invention addresses the problem arising when a material having a large capacity density is used as a negative electrode active material, i.e. decrement in discharge capacity by increased irreversible capacity, and can provide a non-aqueous electrolyte secondary battery having a large capacity and excellent balance of characteristics. A non-aqueous electrolyte secondary battery of the present invention is useful for the main power supply for mobile communication equipment, portable electronic equipment, or the like.

The invention claimed is:

1. A method of manufacturing a negative electrode, the method comprising:
    a first step of forming a plurality of columnar active material blocks capable of electrochemically storing and releasing lithium ions on a surface of a current collector;
    a second step of producing particulate lithium by vapor deposition; and
    a third step of disposing the particulate lithium produced in the second step in gaps between the active material blocks,
    wherein, in the third step, a liquid dispersion in which the particulate lithium is dispersed in a dispersing medium is applied to the current collector having the active material blocks, and the applied liquid dispersion is dried.

2. A method of manufacturing a negative electrode, the method comprising:
    a first step of forming a plurality of columnar active material blocks capable of electrochemically storing and releasing lithium ions on a surface of a current collector;
    a second step of producing particulate lithium having a diameter of 0.3 to 15 μm by vapor deposition; and
    a third step of disposing the particulate lithium produced in the second step in gaps between the active material blocks by a liquid dispersion in which the particulate lithium is dispersed,
    wherein a lithium carbonate layer is formed on a surface of the particulate lithium before the particulate lithium is disposed in the gaps between the active material blocks.

3. The method of manufacturing a negative electrode according to claim 2,
    wherein the particulate lithium on which the lithium carbonate layer is formed contains lithium at 99% or more.

4. The method of manufacturing a negative electrode according to claim 2, wherein the particulate lithium produced in the second step has a diameter of 0.3 to 15 μm.

* * * * *